United States Patent
Ono et al.

(10) Patent No.: US 6,678,478 B1
(45) Date of Patent: Jan. 13, 2004

(54) CORRECTING METHOD OF OPTICAL SIGNAL TRANSMISSION SYSTEM AND OPTICAL SIGNAL TRANSMISSION SYSTEM USING SAID CORRECTING METHOD

(75) Inventors: Atsushi Ono, Tokyo (JP); Takashi Sekino, Tokyo (JP)

(73) Assignee: Advantest Corporation, Tokyo (JP)

( * ) Notice: Subject to any disclaimer, the term of this patent is extended or adjusted under 35 U.S.C. 154(b) by 477 days.

(21) Appl. No.: 09/584,749

(22) Filed: Jun. 1, 2000

(30) Foreign Application Priority Data

Jun. 1, 1999 (JP) .............................. 11-153849

(51) Int. Cl.[7] .............................................. H04B 10/12
(52) U.S. Cl. ......................... 398/141; 398/23; 398/24; 398/162; 398/195
(58) Field of Search ................... 359/110, 161, 359/173, 188, 195; 398/23, 24, 32, 141, 162, 195

(56) References Cited

U.S. PATENT DOCUMENTS

| 4,292,606 A | * | 9/1981 | Trimmel ...................... 359/237 |
| 4,385,387 A | * | 5/1983 | Trimmel ................... 372/38.07 |
| 4,471,494 A | * | 9/1984 | Keil et al. ................... 359/182 |
| 5,526,164 A | * | 6/1996 | Link et al. ................... 359/187 |

* cited by examiner

Primary Examiner—Leslie Pascal
Assistant Examiner—Dzung Tran
(74) Attorney, Agent, or Firm—Rosenthal & Osha L.L.P.

(57) ABSTRACT

A correcting method of an optical signal transmission system that applies an optical signal generated by light-emitting action to an input end of an optical fiber and converts an optical signal arising at an output end of said optical fiber to an electrical signal by photo-electric conversion including: transmitting said optical signal by inputting said optical signal to said optical fiber and generating said electrical signal; and adjusting at least one of an electric current related to said light-emitting action and an electric current related to said photo-electric conversion according to an electric current of said electric signal.

23 Claims, 9 Drawing Sheets

CORRECTING METHOD OF OPTICAL SIGNAL TRANSMISSION SYSTEM AND OPTICAL SIGNAL TRANSMISSION SYSTEM USING SAID CORRECTING METHOD

This patent application claims priority based on a Japanese patent application, H11-153849 filed on Jun. 1, 1999, the contents of which is incorporated herein by reference.

BACKGROUND OF THE INVENTION

1. Field of the Invention

The present invention relates to a correcting method of an optical signal transmission system and an optical signal transmission system using said correcting method. More particularly, the present invention relates to a correcting method of an optical signal transmission system including photo-electric conversion, and an optical signal transmission system using said correcting method.

2. Description of the Related Art

An optical signal transmission system generally excels in reliability and transmission speed and rapidly broadens the fields of application, as a means of signal transmission. An optical signal transmission system, which utilizes an optical fiber, is sometimes used for transmitting a signal between a main body unit and a test head, on which a semiconductor device is mounted, of a semiconductor device testing apparatus. With recent rapid improvements of the performance of semiconductors, an apparatus that tests such devices has to be able to be operated with extremely high speed and high reliability.

One of the basic principles of an operation of an optical signal transmission system is: converting an electrical signal to an optical signal and applying this optical signal to an input end of the optical fiber, and converting an optical signal arising at an output end of the optical fiber into an electrical signal by a photo-electric conversion. An electric current driving type laser diode is mainly used for generating a light-emitting action at the input side of the optical fiber. A problem arises because there is unevenness in the relationship between the electric current that drives the laser diode and the brightness of a light of the laser diode driven by the electric current.

FIG. 1 shows a correlation between a driving current of the laser diode and brightness. Here, the characteristic of the diode is shown for three kinds of surrounding temperatures T=T0, T1, and T2. As shown in the figure, the laser diode does not oscillate when an electric current is below some value, and increases brightness linearly when an electric current exceeds some value. The value is called a threshold value, and the threshold value increases with the increase of the surrounding temperature. Also, there is unevenness of the threshold current among each of the laser diodes.

Because of the influence shown above, for example, if transmitting a high-speed clock, a gap may be caused between the threshold value of a signal expected at the light-emitting side and the light receiving side, so that a duty ratio of a clock may be changed, or a skew is caused among many signals which has to essentially be changed simultaneously. The phenomenon shown above becomes an obstruction to the increase of speed of transmission. Especially, for a semiconductor device testing apparatus, which is required to operate in a broad range from a direct current to a high frequency, it is difficult to solve the above problems with respect to both increasing the speed of operation and also maintaining stability of operation for each frequency.

SUMMARY OF THE INVENTION

Therefore, it is an object of the present invention to provide a series of technologies for realizing a preferable form of transmitting a signal using an optical signal transmission system, which overcomes the above issues in the related art. More particularly, it is an object of the present invention to provide correction technology that can perform a desired adjustment on a signal, which is to be transmitted by the optical signal transmission system, and the optical signal transmission system utilizing the correction technology. This object is achieved by combinations described in the independent claims. The dependent claims define further advantageous and exemplary combinations of the present invention.

According to the first aspect of the present invention, a correcting method of an optical signal transmission system that applies an optical signal generated by light-emitting action to an input end of an optical fiber and converts an optical signal arising at an output end of the optical fiber to an electrical signal by photo-electric conversion can be provided. The correcting method includes: transmitting the optical signal by inputting the optical signal to the optical fiber and generating the electrical signal; and adjusting at least one of an electric current related to the light-emitting action and an electric current related to the photo-electric conversion according to an electric current of the electric signal.

The adjustment of an electric current may include: adjusting magnitude of an electric current, which generates the light-emitting action, so that the magnitude of an electric current of the electric signal and the magnitude of a predetermined reference current matches. The adjustment of an electric current may include: determining the reference current as two kinds of large and small values one after another; adjusting each of two kinds of values of electric currents that generate the light-emitting action according to the two kinds of large and small values; and holding each of the adjusted two kinds of values of electric current individually.

A small value from among the two kinds of large and small values may be determined by assuming a condition in which the optical signal has a faint intensity, which is not "0". The correcting method may further include: judging whether the magnitude of an electric current, which generates the light-emitting action adjusted by the adjusting of an electric current, is within a predetermined permission level. The adjusting of an electric current may include: adjusting the magnitude of a reference current, which is used for detecting a magnitude of an electric current of the electric signal, at a circuit related to the photo-electric conversion so that the magnitude of an electric current of the electric signal generated at the transmitting of the optical signal and the magnitude of the reference current match.

The adjusting of an electric current may include: generating two values, which are to be shown by the optical signal sequentially; adjusting each of two kinds of values of the reference current; and holding the each of adjusted two kinds of values individually. The adjusting of an electric current may include: generating an intermediate value between the adjusted two kinds of values; and judging which of the two kinds of values is shown by the optical signal based on a comparison between the intermediate value and the magnitude of an electric current of the electric signal.

The adjusting of an electric current may include: adjusting a value of the reference current by generating one of two values to be shown by the optical signal; and holding the adjusted value of the reference current. The adjusting of an electric current includes: setting a value of an electric current, which is to be compared to the magnitude of an electric current of the electric signal, to judge which of the two values is shown by the optical signal, based on the adjusted value of the reference current.

The correcting method may further comprise: judging whether the adjusted two kinds of values adjusted at the adjustment of an electric signal is within a predetermined permission level. The correcting method may further comprise: judging whether the adjusted value of the reference current adjusted at the adjustment of an electric signal is within a predetermined permission level.

According to the second aspect of the present invention, an optical signal transmission system having a pre-processing circuit that includes a light-emitting circuit and processes a signal to be input to an optical fiber, and a post-processing circuit that includes photo-electric conversion circuit and converts a signal output from the optical fiber to an electric signal can be provided such that, the optical signal transmission system comprises: a current controlling circuit which adjusts an electric current of the pre-processing circuit or the post-processing circuit according to an electric current of the electric signal.

The current controlling circuit may adjust an electric current which generates a light-emitting action at the light-emitting circuit according to the electric current of the electric signal. The current controlling circuit may have a storing circuit which holds a magnitude of an electric current of the electric signal when the magnitude of an electric current of the electric signal matches a magnitude of a predetermined reference current. The storing circuit may include a circuit that holds the magnitude of an electric current of two kinds of the electric signal, each corresponding to each of the magnitude of the reference current having two kinds of large and small values.

The post-processing circuit may have a comparison circuit that compares a magnitude of the electric current of the electric signal and a magnitude of a predetermined reference current; and the current controlling circuit may include: a circuit that changes a magnitude of an electric current, which generates the light-emitting action, monotonously; and a circuit that fixes a magnitude of an electric current which generates the light-emitting action when a relationship between the magnitude of an electric current of the electric signal and the magnitude of the reference current reverses.

The circuit that changes the magnitude of the electric current monotonously may include: a counter circuit that performs increment operation or decrement operation; and a circuit that fixes the magnitude of the electric current including a masking circuit that stops the increment operation or decrement operation of the counter circuit. The optical signal transmission system may further include a circuit that judges whether the magnitude of the electric current which generates the light-emitting action adjusted by the current controlling circuit is within a predetermined permission level.

The current controlling circuit may comprise: a measuring circuit which measures a magnitude of the electric current of the electric signal; and a reference value generating circuit that sets a reference current for determining the electric signal in two values based on the measured magnitude of the electric current of the electric signal. The optical signal transmission system may further comprise an output circuit which determines the electric signal in two values based on the reference current. The measuring circuit may measure the magnitude of an electric current of the electric signal for each of two values, which is to be shown by the electric signal, individually; and the reference value generating circuit generates an electric current, the magnitude of which takes an intermediate value of the magnitude of an electric current of the electric signal measured individually, as the reference current.

The measuring circuit may measure the magnitude of the electric current of the electric signal for one of two values, which is to be shown by the electric signal; and the reference value generating circuit may set a value of an electric current to be compared to the magnitude of the electric current of the electric signal for judging which of the two values will be shown by the electric signal based on the measured magnitude of the electric current of the electric signal. The optical signal transmission system may further include a circuit that judges whether the magnitude of the electric current of the electric signal measured by the measuring circuit is within a predetermined permission level.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
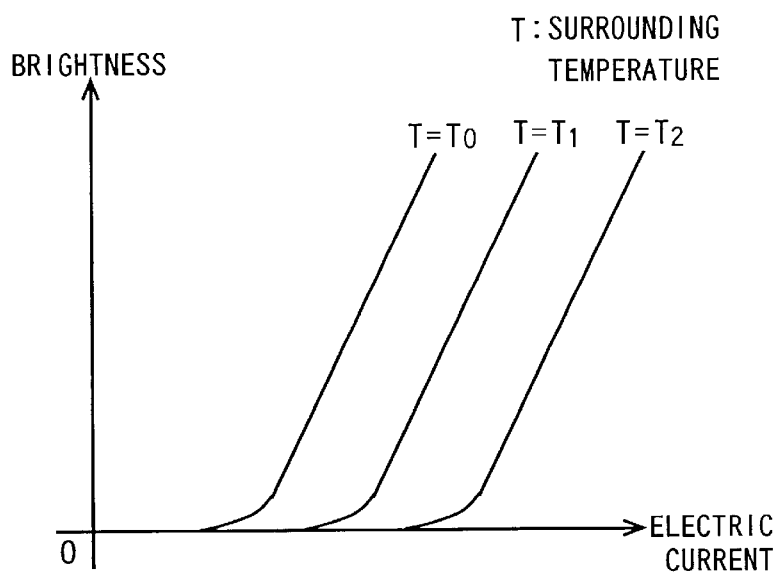
FIG. 1 shows a correlation between a driving current of the laser diode and brightness.
Figure 2:
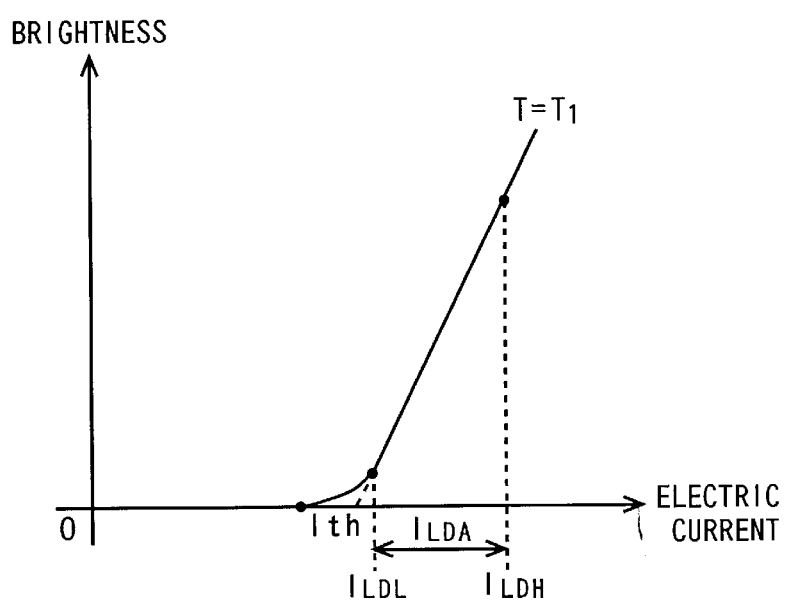
FIG. 2 shows a method for determining a signal, which is to be transmitted by the optical signal transmission system according to the present embodiment.

FIG. 2 shows a method for determining a signal, which is to be transmitted by the optical signal transmission system according to the present embodiment, using two values based on the correlation between the driving current and brightness of the laserdiode. The signal to be transmitted will be called an "object signal" in the following. FIG. 2 shows a correlation when the surrounding temperature T is T1, and Ith denotes the threshold current. In the present embodiment, the object signal shows two values of "0" or "1".

An electric current, which is to be supplied to the laser diode at the light-emitting side so that the object signal can be finally judged as "0" at the light-receiving side, will be called a low-driving current, shown as $I_{LDL}$ in the figure. Also, an electric current, which is to be supplied to the laser diode at the light-emitting side so that the object signal can be finally judged as "1" at the light-receiving side, will be called a high-driving current, shown as $I_{LDH}$ in the figure. Moreover, an electric current of a difference between two electric currents, that is, the electric current which becomes a high-driving signal when low-driving current is added, will be called an additional driving current, shown as $I_{LDA}$ in the figure.

In the present embodiment, in order to set the driving signal to be an optimum value, the brightness of the light of the object signal is observed at the light-receiving side, and the low-driving current and the high-driving current are determined at the light-receiving side based on the observed result. The transmission characteristic of the whole of the system can thus be corrected. The reason for setting the low-driving current to be a faint electric current which is not "0", which is the value exceeding the threshold value here, is to increase a reactivity of the brightness of the laser diode to the change of the driving current.

Figure 3:
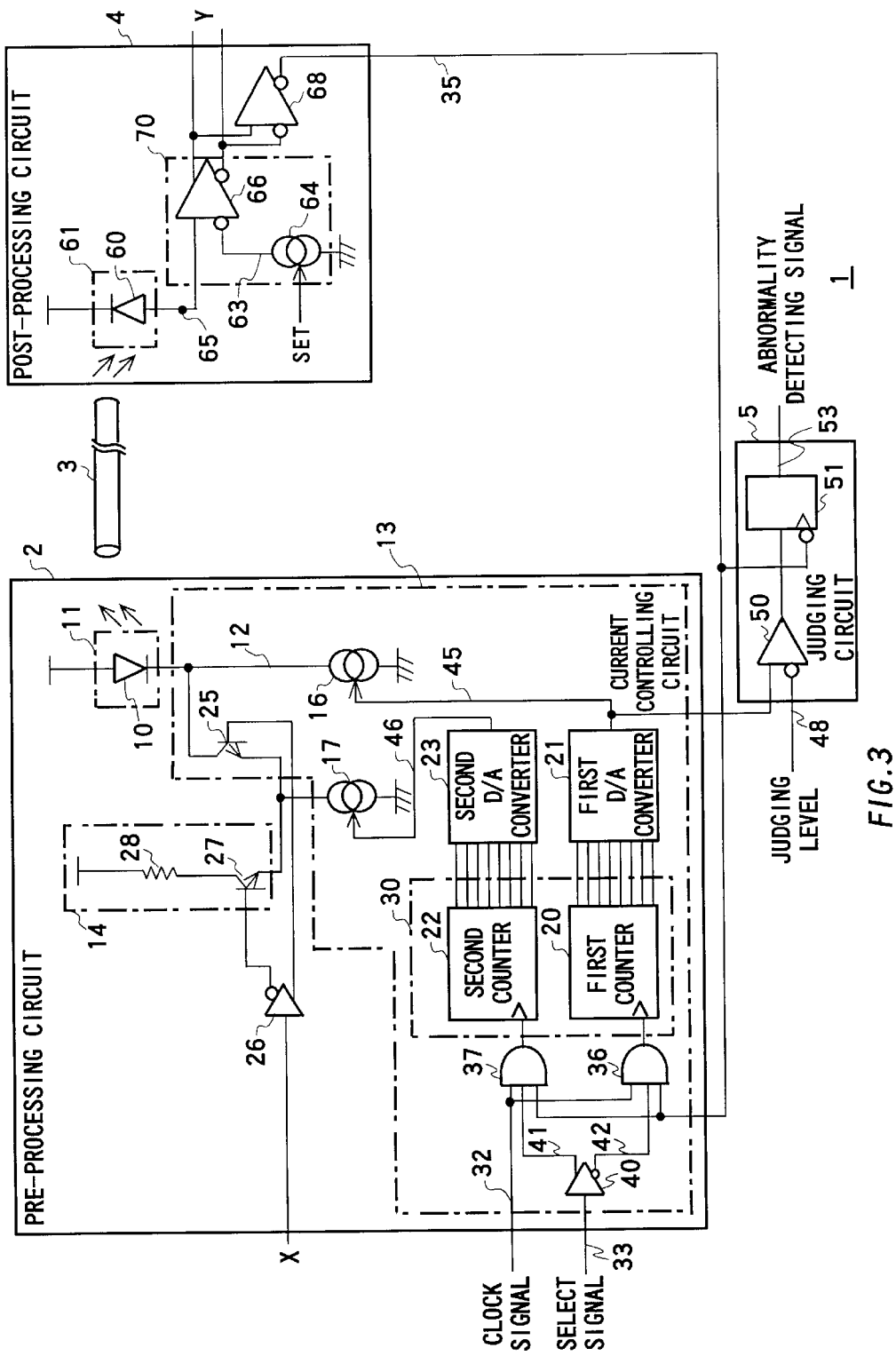
FIG. 3 shows a configuration of an optical signal transmission system 1 according to the present embodiment.

FIG. 3 shows a configuration of an optical signal transmission system 1 according to the present embodiment. First, the whole of the configuration of the system will be explained, and the operation of the system will be explained later. As shown in FIG. 3, a optical signal transmission system 1 mainly includes a pre-processing circuit 2 provided at the light-emitting side that processes a signal which is to be input to an optical fiber 3, a post-processing circuit 4 provided at the light-receiving side that processes a signal which is to be output from the optical fiber 3, and a judging circuit 5 which confirms whether a signal is transmitted normally. The optical signal transmission system 1 can be constituted by only one pre-processing circuit 2 or post-processing circuit 4, and the optical fiber 3 and the judging circuit 5 are dispensable. The above points can be applied for the following embodiments.

The pre-processing circuit 2 mainly includes a light emitting circuit 11 constituted by a laser diode 10, a current controlling circuit 13 that controls a driving current 12 of a light emitting circuit 11, and a compensation circuit 14 of a source current which will be explained below. The current controlling circuit 13 has a low-driving source 16 for supplying the low-driving current and an additional driving current source 17 for supplying an additional current. When both the low-driving current and the additional current are on, a high-driving current flows as the driving current 12. For ensuring the reactivity explained previously, the pre-processing circuit 2 has a configuration in which the low-driving current always flows. As a result, the laser diode 10 lights a little, even when the laser diode 10 is in the darkest state.

The additional driving current source 17 has a configuration of being on only when the object signal, shown as X in the figure, which is to be processed by the pre-processing circuit 2, is "1". More specifically, a transistor 25 is provided on the route between the light emitting circuit 11 and the additional driving current source 17, and the object signal is input to the base of the transistor 25 through the buffer 26. When the object signal is "1", the positive logic output of the buffer 26 becomes high, the transistor 25 turns on, and the additional driving current thus flows.

On the other hand, the pre-processing circuit 2 has a configuration in which a compensation current, which corresponds to the additional driving current, flows to the compensation circuit 14 side when the object signal is "0". This configuration is included for ensuring that the characteristics of the whole system are constant, by maintaining a constant source current without dependence on the status of the object signal, and may be necessary for the high-speed multi-bit transmission.

More specifically, the transistor 27 is connected to the additional driving current source 17 through the load resistor 28 which is connected to the power source, and the negative logic output of the buffer 26 is connected to the base of the transistor 27. Therefore, the negative logic output of the buffer 26 becomes high when the object signal is "0", and the compensation current flows through the load resistor 28.

The current controlling circuit 13 further has a first counter 20, a first D/A convertor 21, a second counter 22, and a second D/A convertor 23. The first counter 20 holds the value of an electric current, which is to be supplied by the low-driving source 16, in a digital value. The first D/A convertor 21 converts the digital value held by the first counter 20 into an analog value. Similarly, the second counter 22 holds the value of an electric current, which is to be supplied by the additional driving current source 17, in a digital value. The second D/A convertor 23 converts the digital value held by the second counter 22 to an analog value.

The first counter 20 and the second counter 22 constitute a storing circuit 30, and the results of the correction are stored in the storing circuit 30. Each of an output 45 of the first D/A convertor 21 and an output 46 of the first D/A convertor 23 is connected to the low-driving source 16 and the additional driving current source 17, respectively, and each controls the electric current that flows to the low-driving source 16 and the additional driving current source 17.

The first counter 20 and the second counter 22 are the elements, which count an edge of an input pulse. Here, the signals, which relate to controlling the system, are a clock signal 32, a select signal 33, and a count allowable signal 35. The clock signal 32 increments the first counter 20 and the second counter 22 during the correcting operation of the system. The select signal 33 selects which counter is to be incremented. The count allowable signal 35 determines whether or not to permit the increment operation. The clock signal 32 is effective only when the system performs the correcting operation, and the clock signal 32 is fixed to the low or high signal when the system does not perform the correcting operation. As a result, the increment operation does not mistakenly occur during normal operation.

The clock signal 32 is input to a first AND gate 36 and a second AND gate 37. Both the first AND gate 36 and the second AND gate 37 have three input terminals. The first AND gate 36 and the second AND gate 37 functions as a masking circuit that permits or stops the increment operation of the first counter 20 and the second counter 22.

The select signal 33 is input to a buffer 40, a positive logic output 41 of the buffer 40 is input to the second AND gate 37, and a negative logic output 42 of the buffer 40 is input to the first AND gate 36, respectively. The count allowable signal 35 is input to both the first AND gate 36 and the second AND gate 37. The output of the first AND gate 36 is input to the first counter 20 as a trigger signal of the counting operation. On the other hand, the output of the second AND gate 37 is input to the second counter 22. In this configuration, if assuming the count allowable signal 35 is "1", the first counter 20 is incremented by the clock signal 32, and the second counter 22 does not change whilst the select signal 33 is "0". While the select signal 33 is "1", the second counter 22 is incremented by the clock signal 32, and the first counter 20 does not change. After the count allowable signal 35 becomes "0", none of the counters change. The change of the count allowable signal 35 from "1" to "0" corresponds to the ending of the correcting operation.

The judging circuit 5 is provided for detecting the transmission loss that occurred in the optical fiber 3 or occurred at the end portion of the optical fiber 3. The optical fiber 3 is generally connected to the pre-processing circuit 2 and the post-processing circuit 4 by a means such as a connector. If dust or stains are present on the connection part between the optical fiber 3 and the pre-processing circuit 2 or the post-processing circuit 4, the transmission loss increases. This problem is an important matter of concern for maintaining the performance and reliability of the system, and needs to be solved.

Here, if the driving signal set as a result of the correction, which will be explained later, is too large, it is judged that the system is in an abnormal state in which an abnormally large transmission loss has occurred. More specifically, the judging circuit 5 includes a comparator 50 that compares an output 45 of the first D/A convertor 21 and a predetermined judging level 48 and a flip-flop 51 that inputs the output of the comparator 50 and outputs an abnormality detecting signal 53. This flip-flop 51 is a negative edge trigger type flip-flop, and the count allowable signal 35 is input to the flip-flop 51 as a trigger signal. Therefore, when the count allowable signal 35 changes from high to low, that is, when the correcting operation finishes, the abnormality detecting signal 53 becomes high if the output 45 of the first D/A convertor 21 is higher than the judging level 48. Then, it is reported that the system is in an abnormal condition. The configuration of the pre-processing circuit 2 and the judging circuit 5 have been explained above.

The post-processing circuit 4 includes a photoelectric converting circuit 61, a reference current source 64, a current input differential comparator 66, and a buffer amplifier 68. The photoelectric converting circuit 61 is constituted by a photodiode 60. The reference current source 64 generates a reference current 63 used for the correcting operation. The current input differential comparator 66, which will be simply called a "current comparator" in following, compares an electric current of an electric signal obtained at the photoelectric converting circuit 61, which will be called a "regenerating electric signal 65" in following, with the reference current 63. The reference current source 64 and the current comparator 66 form a comparison circuit 70. The output of the current comparator 66 becomes the same value as the final output signal Y, and the negative logic output of the buffer amplifier 68 becomes the count allowable signal 35.

The basic principle of the correcting operation of this configuration is: determining the reference current 63 using a large and small value one after another, and controlling the current controlling circuit 13 of the pre-processing circuit 2 by the count allowable signal 35 so that the electric current of the regenerating electric signal 65 matches each of the two values of the reference current 63.

The large side of the two values, which will be called a high-reference current value in following, is a value determined by assuming that the object signal is "1". The small side of the two values, which will be called a low-reference current value in following, is a value determined by assuming that the object signal is "0". When the correction is made so that the electric current of the regenerating electric signal 65 matches the high-reference current, a high-driving current is determined in the current controlling circuit 13 of the pre-processing circuit 2. Similarly, when the correction is made so that the electric current of the regenerating electric signal 65 matches the low-reference current, a low-driving current is determined in the current controlling circuit 13.

If there are a plurality of signals to be transmitted, the optical signal transmission system 1 shown in FIG. 3 is provided for each of the plurality of signals. Therefore, there is also a plurality of post-processing circuits 4. Here, by setting each of all the high-reference current values and all of the low-reference current values to the same value, respectively, for a plurality of the post-processing circuits 4, all of the unevenness that will become a problem, such as the unevenness of the characteristics of the laser diode 10 of the light emitting circuit 11, the unevenness of the transmission loss, and the unevenness of the characteristics of the photodiode 60 of the photoelectric converting circuit 61, can be corrected collectively. As a result, the skew occurring among a plurality of signals can be reduced.

Figure 4:
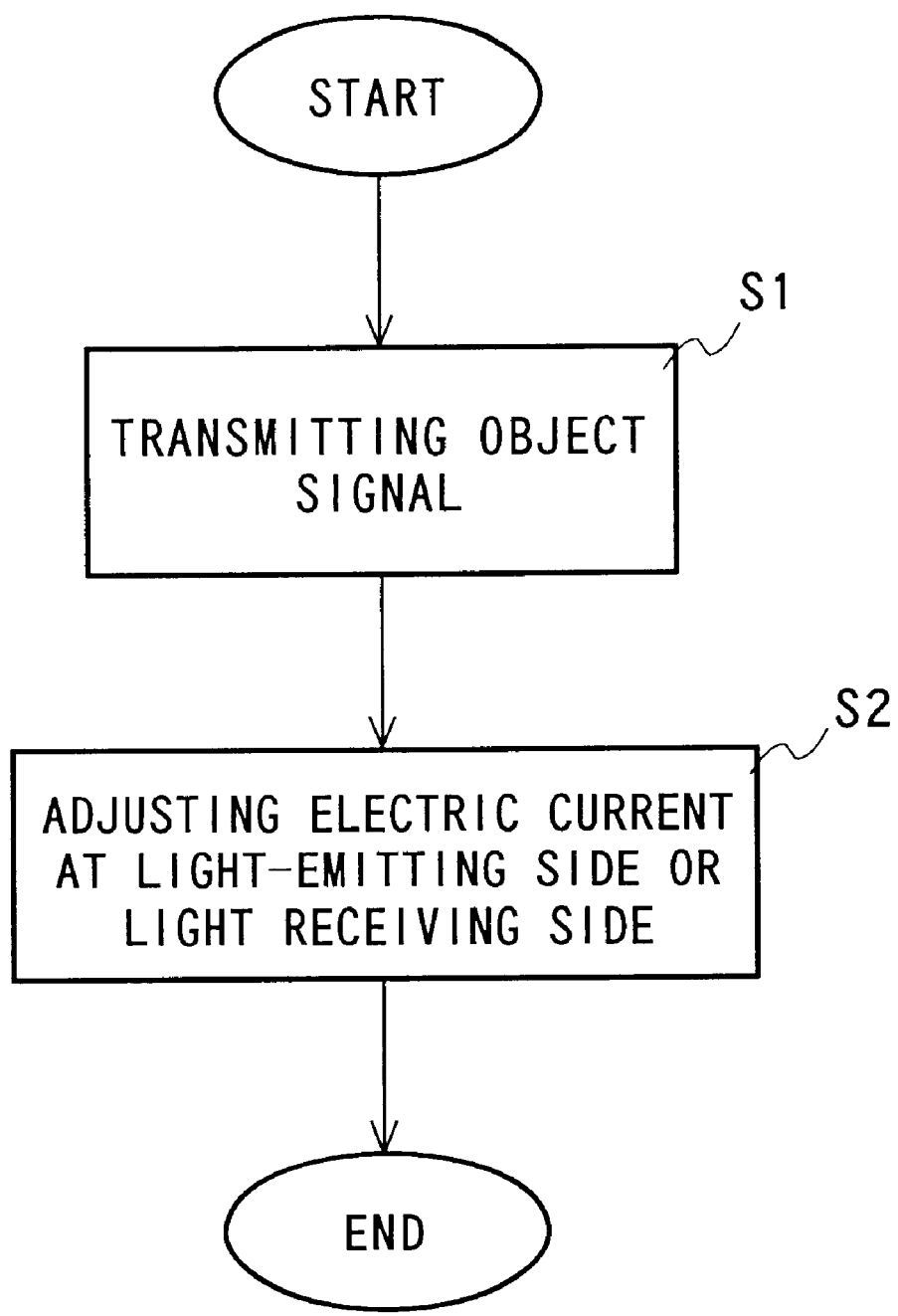
FIG. 4 shows a flow chart of the correcting method according to the present embodiment.

FIG. 4 shows a flow chart of the correcting method according to the present embodiment. First, as shown in the figure, the object signal is transmitted for the correcting operation (S1). Next, an electric current related to a light-emitting action of the light-emitting side or an electric current related to the photo-electric conversion of the light-receiving side is adjusted, based on the result of the comparison between the electric current of the regenerating electric signal 65 obtained at the photoelectric converting circuit 61 of the post-processing circuit 4 and the reference current 63 (S2). The driving current of the light emitting side is adjusted in the configuration shown in FIG. 3. The adjustment of an electric current at the light receiving side will be explained later, using the other examples.

Figure 5:
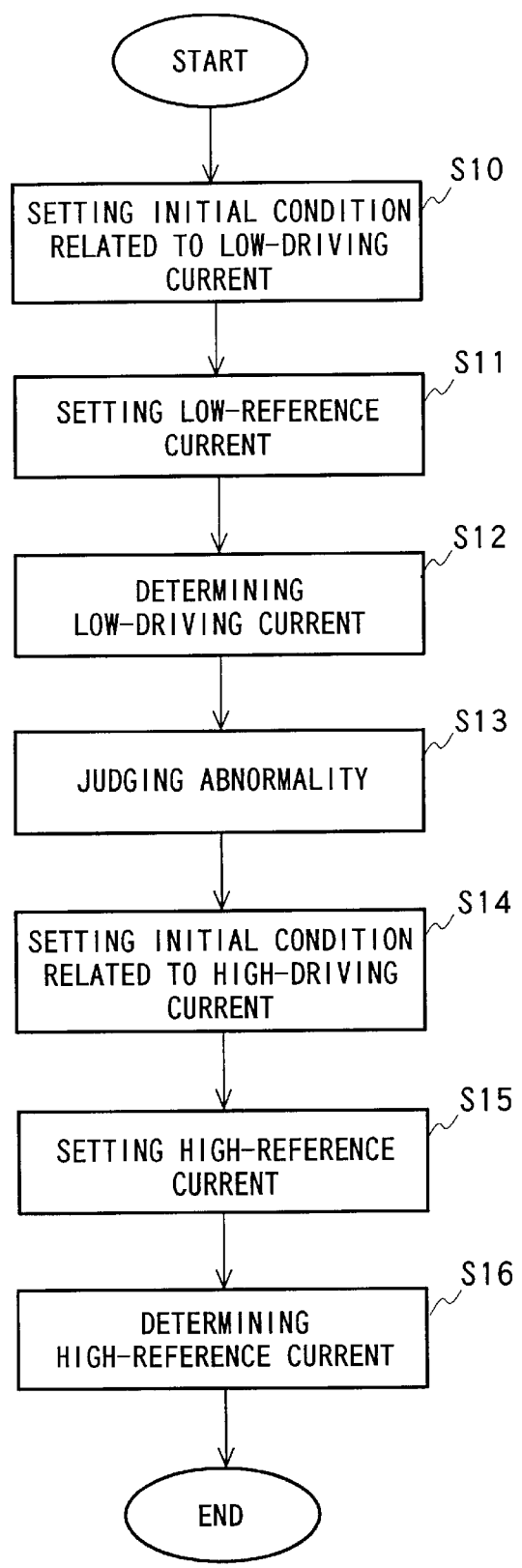
FIG. 5 shows detailed flow chart of the procedure shown in FIG. 4.

FIG. 5 shows detailed flow chart of the procedure shown in FIG. 4. As shown in FIG. 5, first, the initial condition for the correction related to the low-driving current is set (S10). Here, both the first counter 20 and the second counter 22 of the pre-processing circuit 2 are cleared to be "0", and the select signal 33 is set to "0". Furthermore, the object signal is set to "0", and the transistor 25 is thus off so that the route between the light emitting circuit 11 and the additional driving current source 17, through which the electric current should not flow when adjusting the low-driving source 16, is cut off.

In this condition, a predetermined low-reference current value is set at the reference current source 64 of the post-processing circuit 4, to determine the low-driving current in the pre-processing circuit 2 (S11). The low-reference current value is obtained beforehand by means such as experimentation, so that the low-driving current value, which is the value of $I_{LDL}$ shown in FIG. 2, becomes slightly larger than the threshold current value, which is the value of $I_{th}$ shown in FIG. 2.

Until the procedure explained above, both outputs of the first counter 20 and the second counter 22 are "0", and both the low-driving source 16 and the additional driving current source 17 do not supply an electric current. Therefore, the laser diode 10 does not emit any light at all, and there is thus no light transmission to the optical fiber 3. Therefore, the electric current of the regenerating electric signal 65 obtained at the photoelectric converting circuit 61 becomes smaller than the low-reference current. Then, the positive logic output of the comparison circuit 70 becomes low, and the negative logic output of the comparison circuit 70 becomes high. Therefore, the negative logic output of the buffer amplifier 68, which is the count allowable signal 35, becomes high.

On the other hand, because the select signal 33 is low, the negative logic output 42 of the buffer 40 becomes high and the positive logic output 41 of the buffer 40 becomes low. Therefore, the first AND gate 36 passes the clock signal 32, and the first counter 20 is incremented for each arrival of the edge of the clock signal 32. On the other hand, because the output of the second AND gate 37 becomes always low, the output of the second counter 22 is fixed to "0". Due to the increment operation of the first counter 20, the value of the output 45 of the first D/A convertor 21 gradually increases, and the low-driving source 16 is controlled to gradually increase the low-driving current.

Then the light emitting circuit 11 starts emitting a light, and the light emitted from the light emitting circuit 11 is transmitted through the optical fiber 3 and reaches the post-processing circuit 4. The electric current of the regenerating electric signal 65 thereby gradually increases, and the electric current of the regenerating electric signal 65 will become larger than the low-reference current, at some point in time. At that moment, the output of the comparison circuit 70 and the buffer amplifier 68 reverses and the count allowable signal 35 changes from high to low. With the change of the count allowable signal 35, the output of the first AND gate 36 becomes low, and the increment operation of the first counter 20 is prohibited. As a result, the desired low-driving current is determined (S12).

Figure 6:
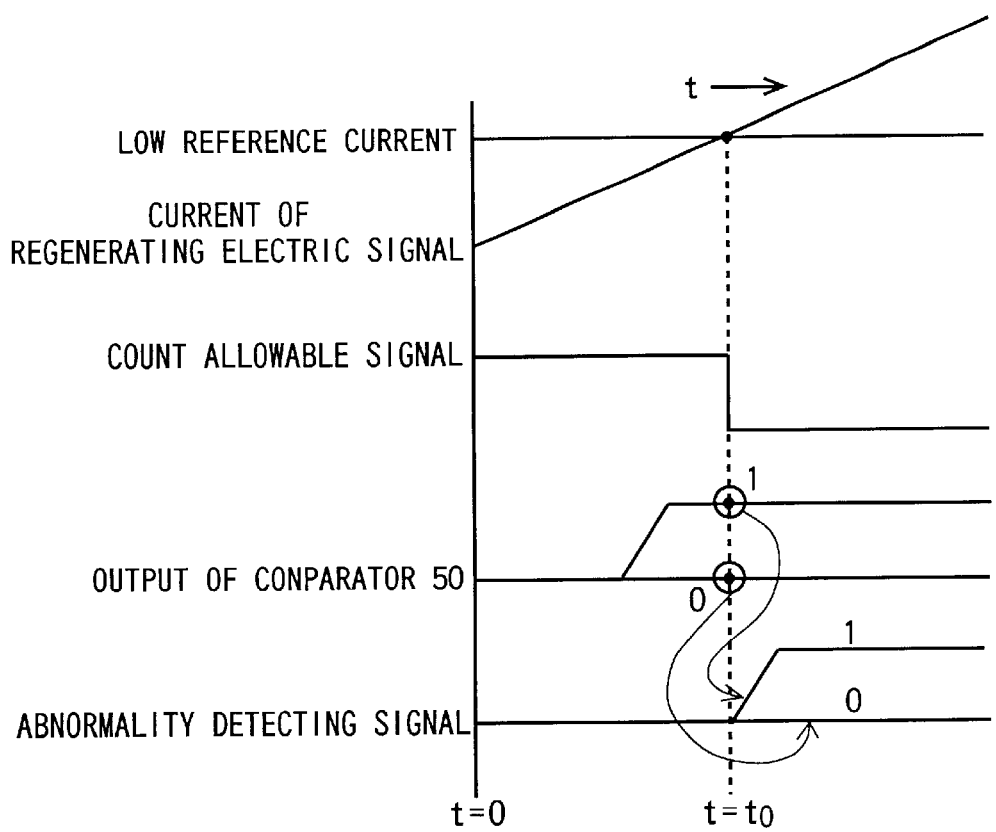
FIG. 6 shows a timing chart of the operation of the judging circuit 5.

FIG. 6 shows a timing chart of the operation of the judging circuit 5. In the judging circuit 5, the comparator 50 always compares the output 45 of the first D/A convertor 21 and the judging level 48, and the result of the comparison is stored in the flip-flop 51 at the moment when the count allowable signal 35 changes from high to low, which is when t0 shown in FIG. 6. If the low-driving current is set to be larger than the judging level 48, the abnormality detecting signal 53, which is an output of the flip-flop 51, becomes active, that is, becomes "1", and if the low-driving current is less than the judging level 48, that is a normal condition, the abnormality detecting signal 53 does not change and stays as "0" (S13)

Next, the initial condition for correcting the high-driving current is set (S14). Here, the select signal 33 is set to "1", and the object signal X is set to "1". The transistor 25 is thus on, and therefore the route between the light emitting circuit 11 and the additional driving current source 17 is connected.

Then, a predetermined high level reference current value is set in the reference current source 64 of the post-processing circuit 4 (S15). Because the high-reference current value corresponds to the condition in which the object signal X shows "1", the high-driving current value, which is a value of $I_{LDH}$ shown in FIG. 2, is determined to be sufficiently large.

Because the select signal 33 is high, the negative logic output 42 of the buffer 40 becomes low, and the positive logic output 41 becomes high. Therefore, the second AND gate 37 passes the clock signal 32, and the second counter 22 is incremented for each arrival of the edge of the clock signal 32. On the other hand, the count value of the first AND gate 36 does not change.

Due to the increment operation of the second counter 22, the value of the output 46 of the second D/A convertor 23 gradually increases, and the additional driving current source 17 is controlled to gradually increase the additional driving current. Because the low-driving current flows constantly, the sum of the additional driving current and the low-driving current flows to the light emitting circuit 11 as the high-driving current. The light generated by the light emitting circuit 11 is transmitted through the optical fiber 3 and reaches the post-processing circuit 4. The electric current of the regenerating electric signal 65 thereby gradually increases, and the electric current of the regenerating electric signal 65 will become larger than the high-reference current, at some point in time.

At that moment, the output of the comparison circuit 70 and the buffer amplifier 68 reverse and the count allowable signal 35 changes from high to low. With the change of the count allowable signal 35, the output of the second AND gate 37 becomes low, and the increment operation of the second counter 22 is prohibited. As a result, the additional driving current is determined, and the value of the additional driving current is stored in the second counter 22. The high-driving current which is a sum of the low-driving current and the additional driving current is then determined (S16), and the correcting operation finishes.

For a normal operation in following, first, the control of the reference current source 64 is fixed so that the reference current 63 of the post-processing circuit 4 becomes the intermediate value of the low-reference current and the high-reference current such as a median. If the object signal X is "0", because the electric current of the regenerating electric signal 65 should be equal to the low-reference current, the regenerating electric signal 65 can be reliably determined as "0" by comparing with the intermediate value. On the other hand, if the object signal X is "1", because the electric current of the regenerating electric signal 65 should be equal to the high-reference current, the regenerating electric signal 65 can be reliably determined as "1" by comparing with the intermediate value.

According to this embodiment, the skew among the plurality of signals to be transmitted can be reduced, and also the duty ratio even when the high-speed clock signal is transmitted can be accurately maintained by setting the intermediate value appropriately. The characteristic explained above is convenient for increasing the operating speed of whole of the optical signal transmission system 1. The correcting operation may be performed in an appropriate time. With the consideration of the characteristics of the laser diode 10, for example, the correcting operation is desired to be performed when the surrounding temperature of the optical signal transmission system 1 changes in some degree.

Figure 7:
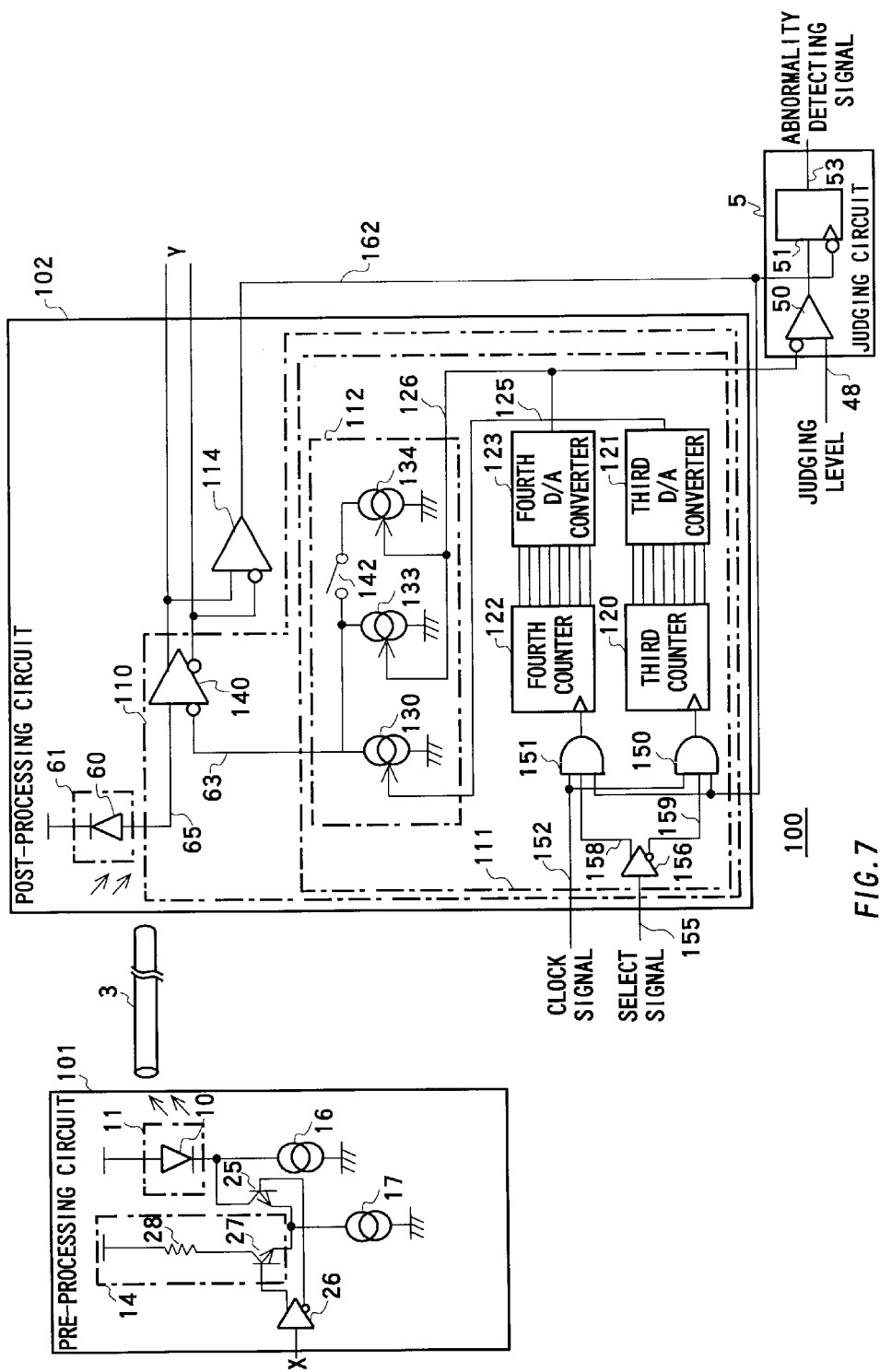
FIG. 7 shows a configuration of an optical signal transmission system 100 according to another embodiment.

FIG. 7 shows a configuration of an optical signal transmission system 100 according to another embodiment. This optical signal transmission system 100 is an example of adjusting the electric current related to the photo-electric conversion of the light-receiving side at the procedure S2 shown in FIG. 4. In this embodiment, each of the low-driving current and the high-driving current in the pre-processing circuit 101 is a fixed value, and each of the low-reference current and the high-reference current is adjusted in the post-processing circuit 102 so that each of the low-reference current and the high-reference current match with the low-driving current and the high-driving current in the pre-processing circuit 101. Thereby the same effect can be obtained as the effect of the configuration shown in FIG. 3.

Here, the low-driving current is larger than the threshold value. The same reference numerals as the reference numerals of FIG. 3 are provided to the configurations of the FIG. 7, which has the same configuration as the configuration of FIG. 3. The explanation for the configuration, which is the same between FIGS. 3 and FIGS. 7, will thus be omitted appropriately.

Also in this embodiment, an optical signal transmission system 100 mainly includes a pre-processing circuit 101, an optical fiber 3, a post-processing circuit 102, and a judging circuit 5. The optical signal transmission system 1 can be constituted by only one pre-processing circuit 2 or post-processing circuit 4, and the optical fiber 3 and the judging circuit 5 are dispensable. The above points can be applied for the following embodiments. The judging circuit 5 is attached to the post-processing circuit 102, and the logic of the input and output is reversed with respect to the logic of the input and output in the case of FIG. 3.

The post-processing circuit 102 has a photoelectric converting circuit 61, a current controlling circuit 110, a measuring circuit 111, a reference value generating circuit 112, and a buffer amplifier 114. The current controlling circuit 110 adjusts the reference current 63. The measuring circuit 111 measures a value of an electric current of the regenerating electric signal 65 as a preparation for the adjustment of the measuring circuit 111. The reference value generating circuit 112 generates an intermediate value between the low-reference current and the high-reference current.

The current controlling circuit 110 has a third counter 120, a third D/A convertor 121, a fourth counter 122, and a fourth D/A convertor 123. The third counter 120 holds a value of the low-reference current. The third D/A convertor 121 converts an output of the third counter 120 to an analog value. The fourth counter 122 holds a value of the high-reference current. The fourth D/A convertor 123 converts an output of the fourth counter 122 to an analog value. The low-reference current source 130 is controlled by the output 125 of the third D/A convertor 121.

Both a first additional reference current source 133 and a second additional reference current source 134 are controlled by an output 126 of the fourth D/A convertor 123. The first additional reference current source 133 and the second additional reference current source 134 have the same characteristics. All of these three current sources are connected to a negative input of the current comparator 140 as an element for generating the reference current. A switch 142 is provided to cut off the route between the second additional reference current source 134 and the negative input of the current comparator 140. The three current sources and the switch 142 form a reference value generating circuit 112. Each of the positive and negative outputs of the current comparator 140 become the positive and negative inputs of the buffer amplifier 114.

The current controlling circuit 110 further has a third AND gate 150 and a fourth AND gate 151. The third AND gate 150 controls the increment operation of the third counter 120, and the fourth AND gate 151 controls the increment operation of the fourth counter 122. A clock signal 152 is input to both the third AND gate 150 and the fourth AND gate 151. A select signal 155, which selects the counter to be incremented, is input to the buffer 156. The positive logic output 158 of the buffer 156 is input to the fourth AND gate 151, and the negative logic output 159 of the buffer 156 is input to the third AND gate 150. A count allowable signal 162, which is an output of the buffer amplifier 114, is further input to both the third AND gate 150 and the fourth AND gate 151. The output of the buffer amplifier 114 becomes the same value as the final output signal Y of the optical signal transmission system 100.

Among the configurations shown above related to the post-processing circuit 102, the portion other than the photoelectric converting circuit 61 and the buffer amplifier 114 correspond to the whole of the current controlling circuit 110. Also, the portion, from which is removed the current comparator 140 from the current controlling circuit 110, corresponds to the measuring circuit 111. However, there is a considerable degree of freedom for including any circuit element in the function blocks and interpretation should not be made in a limited way for each of the function blocks.

The configuration of the judging circuit 5 is equivalent to the configuration of the judging circuit 5 shown in FIG. 3, however, the object to be compared with the judging level 48 in the comparator 50 is an output 126 of the fourth D/A convertor 123. The judging level 48 is input to the positive input of the comparator 50, and the output 126 of the fourth D/A convertor 123 is input to the negative input of the comparator 50. The count allowable signal 162 is used as a trigger signal of the flip-flop 51. However, as explained below, the degree of freedom for the design of the judging circuit 5 is large.

Figure 8:
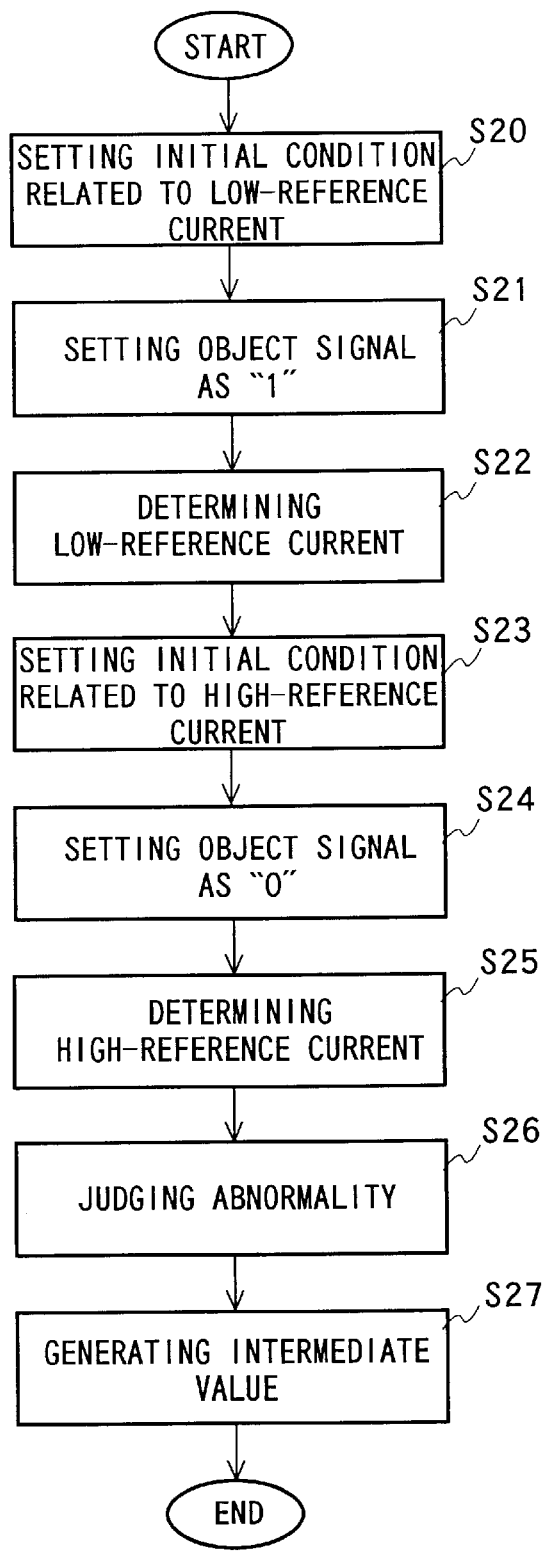
FIG. 8 shows a flow chart of the correcting operation according to the above mentioned configuration.

FIG. 8 shows a flow chart of the correcting operation according to the above mentioned configuration. As shown in the figure, first, an initial condition for the correcting operation for the low-reference current is set (S20). Here, the third counter 120 and the fourth counter 122 are cleared to be "0", and the select signal 155 is set to "0". Moreover, the switch 142 is on.

Next, the object signal X is set to "1" (S21). The transistor 25 is off, and only the low-driving current generated by the low-driving source 16 thus flows to the light emitting circuit 11. The light generated by the light emitting circuit 11 flows to the photoelectric converting circuit 61 through the optical fiber 3, and an electric current of the regenerating electric signal 65 is provided to a positive input of the current comparator 140. Because of the low-reference current source 130, the first additional reference current source 133, and the second additional reference current source 134 do not permit the flow of an electric current in the initial condition, the reference current 63 provided to the negative input of the current comparator 140 is "0". Therefore, the positive logic output of the current comparator 140 becomes high, the negative logic output becomes low, and the count allowable signal 162, which is an output of the buffer amplifier 114, becomes high.

Because the select signal 155 is low now, the negative logic output 159 of the buffer 156 becomes high, and the positive logic output 158 of the buffer 156 becomes low. Therefore, the third AND gate 150 passes the clock signal 152, and the third counter 120 is incremented for each arrival of an edge of the clock signal 152. On the other hand, because the output of the fourth AND gate 151 is always low, the output of the fourth counter 122 is fixed to "0".

Due to the increment operation of the third counter 120, the value of the output 125 of the third D/A convertor 121 gradually increases, and the low-reference current source 130 is controlled to gradually increase the low-reference current. At the moment when the low-reference current exceeds the electric current of the regenerating electric signal 65, the outputs of the current comparator 140 and the buffer amplifier 114 reverses, and the count allowable signal 162 changes from high to low. With the change of the count allowable signal 162, the output of the third AND gate 150 becomes low, and the increment operation of the third counter 120 is prohibited. As a result, the desired low-reference current is determined (S22).

Next, an initial condition for the correcting operation for the high-reference current is set (S23). Here, the select signal 155 is set to "1". Moreover, the object signal X is set to "0" (S24), the transistor 25 is thus on, and the route between the light emitting circuit 11 and the additional driving current source 17 is connected. As a result, a high-driving current which is a sum of the low-driving current and the additional driving current flows to a light emitting circuit 11. The light generated by the light emitting circuit 11 flows to the photoelectric converting circuit 61 through the optical fiber 3. The electric current generated by the regenerating electric signal 65 is provided to the positive input of the current comparator 140. At this time, only the low-reference current supplied by the low-reference current source 130 is provided to the negative input of the current comparator 140. Therefore, the positive logic output of the current comparator 140 becomes high, the negative logic output of the current comparator 140 becomes low, and the count allowable signal 162, which is an output of a buffer amplifier 114, becomes high.

Because the select signal 155 is high now, the negative logic output 159 of the buffer 156 becomes low, and the positive logic output 158 of the buffer 156 becomes high. Therefore, the fourth AND gate 151 passes the clock signal 152, and the fourth counter 122 is incremented for each arrival of an edge of the clock signal 152. On the other hand, because the output of the third AND gate 150 becomes low, the count value of the third counter 120 does not change.

Due to the increment operation of the fourth counter 122, the value of the output 126 of the fourth D/A convertor 125 gradually increases, and the first additional reference current source 133 and the second additional reference current source 134 are controlled to gradually increase the additional reference current. At the moment when the high-reference current, which is a sum of the additional reference current and the low-reference current, exceeds the electric current of the regenerating electric signal 65, the outputs of the current comparator 140 and the buffer amplifier 114 reverses, and the count allowable signal 162 changes from high to low. When the count allowable signal 162 changes from high to low, the judging circuit 5 judges whether the count allowable signal 162 is larger than the judging level 48. If the transmission loss is large, the determined high-reference current becomes small. Therefore, if the high-reference current is below the predetermined judging level 48, the abnormality detecting signal 53, which is an output of the flip-flop 51, becomes high, and an abnormality of the system is reported (S26).

Next, an intermediate value of the low-reference current and the high-reference current, desirably, a value close to an average value is generated (S27). This operation can be performed by switching off the switch 142. If the low-reference current is denoted as IrefL, an additional reference current as IrefA, and a high-reference current as IrefH, the relationship among the above elements can be shown in following equation.

$$IrefH=IrefL+IrefA \quad (1)$$

Because both the first additional reference current source 133 and the second additional reference current source 134 provide the same value of electric current IrefA/2, by switching off the switch 142, the reference current 63 shown as Iref can be expressed as following equation.

$$Iref=IrefL+IrefA/2 \quad (2)$$

On the other hand, the average value IrefAVE between the low-reference current and the high-reference current can be shown in following equation.

$$IrefAVE=(IrefH+IrefL)/2 \quad (3)$$

By comparing equations (1) to (3), it can be understood that the reference current 63 matches the average value. Therefore, the Iref can be shown by the following equation.

$$Iref=IrefAVE$$

If in finishing the correcting operation, the switch 142 is maintained as off, whether the object signal is "1" or "0" can be accurately distinguished by the following normal operation. Also in this embodiment, the effect, which is the same as the effect of the configuration shown in FIG. 3, can be obtained because the correction, which considers both the pre-processing circuit 101 and the post-processing circuit 102, is realized.

Here, the output 126 of the fourth D/A convertor 123 is used for the judging circuit 5. However, the output 125 of the third D/A convertor 121 can be used for the judging circuit 5, and the value, which is obtained by adding the output 125 and the output 126 using an analog calculation can be used for the judging circuit 5. In this case, the judging level 48 is set to be a lower value.

Until now, the transmission loss caused by the abnormality of the system has been considered, however, failure can occurr by penetration of the unused light into the optical fiber 3. In this case, the output 125 of the third D/A convertor 121 or the output 126 of the fourth D/A convertor 123 may be connected to the negative output of the comparator 50, and the judging level 48, which shows the upper limit of the permission level, may be provided to the positive input of the comparator 50. Furthermore, two comparators may be used for confirming both the upper limit and lower limit of the permission level, and the output of the two comparators may be OR operated and output to the flip-flop 51.

Figure 9:
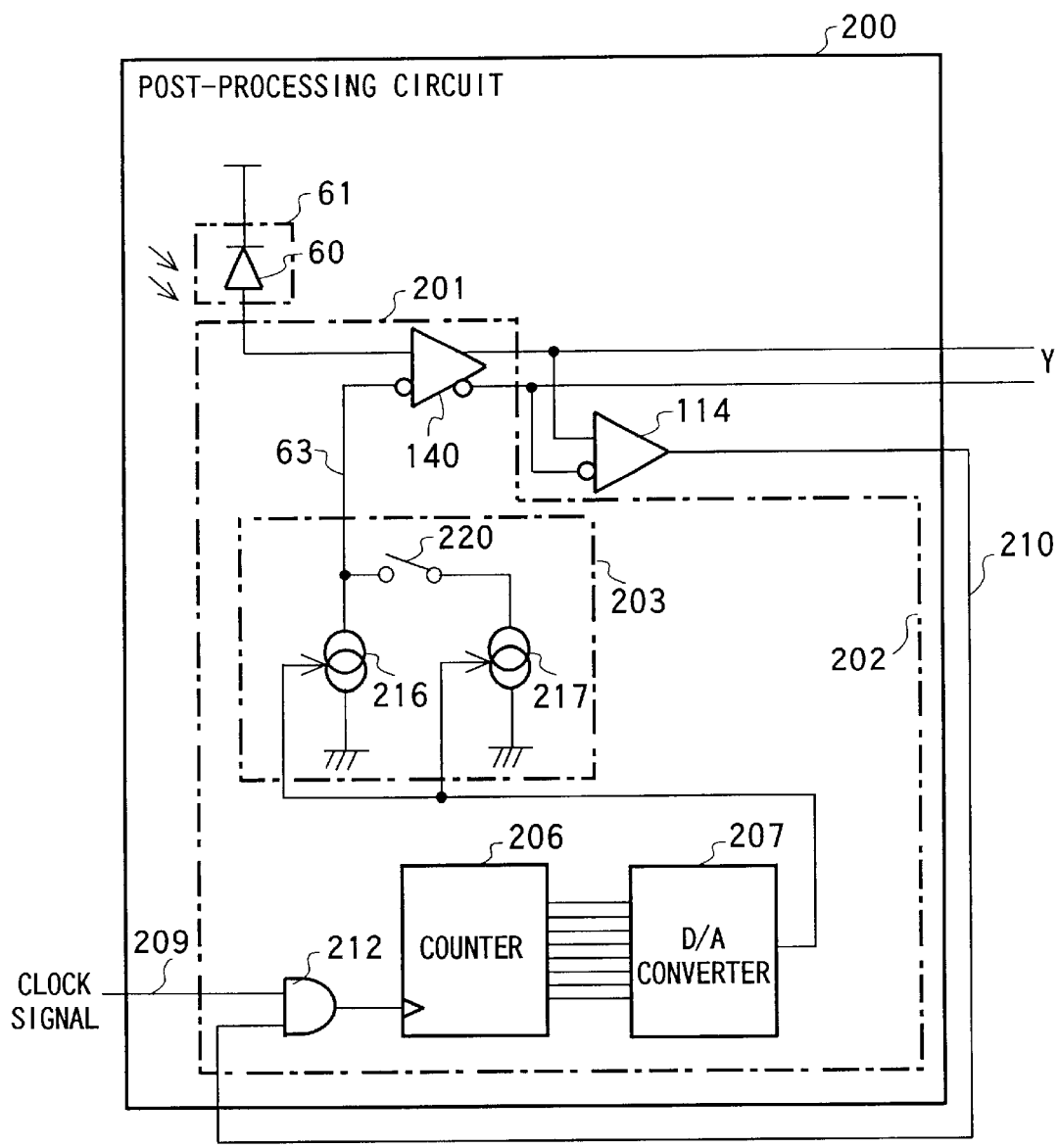
FIG. 9 shows a configuration of another embodiment of the post-processing circuit 102 shown in FIG. 7.

FIG. 9 shows a configuration of another embodiment of the post-processing circuit 102 shown in FIG. 7. The post-processing circuit 200 shown in FIG. 9 has a configuration that deletes the circuit related to the low-reference current in the post-processing circuit 102 shown in FIG. 7. The basic idea of this embodiment is to determine only the high-reference current and generate the reference current 63, which corresponds to the intermediate value explained in FIG. 7, from the high-reference current later. Here, the same reference numerals are given to the same configuration already shown, and the explanation for the same configuration will be omitted appropriately.

The current controlling circuit 201 in this embodiment has a current comparator 140 and a measuring circuit 202. The measuring circuit 202 has a reference value generating circuit 203, a counter 206, a D/A convertor 207, and an AND gate 212. The AND gate 212 has two inputs to input a clock signal 209 and a count allowable signal 210, which is an output of the buffer amplifier 114. The output of the AND gate 212 is a trigger signal for the increment operation of the counter 206. The reference value generating circuit 203 includes two reference current sources, that is, a first reference current source 216 and a second reference current source 217.

These two current sources are connected to the negative input of the current comparator 140 as a generator of a reference current. A switch 220 is provided between the second reference current source 217 and the negative input of the current comparator 140. When the same control is applied to the two current sources, it is assumed that the second reference current source 217 supplies an electric current k times larger than the electric current supplied by the first reference current source 216. The electric current of the first reference current source 216 is denoted as Iref1, and the electric current of the second reference current source 217 is denoted as Iref2.

The operation of the above configuration will be explained in the following. First, the counter 206 is cleared to be "0", and the switch 220 is on. At this time, both the first reference current source 216 and the second reference current source 217 do not supply the electric current. When the object signal is set to "1", the positive logic output of the current comparator 140 becomes high, and the count allowable signal 210, which is an output of the buffer amplifier 114, becomes high. As a result, the clock signal 209 passes an AND gate 212, and the counter 206 begins to be incremented.

The first reference current source 216 and the second reference current source 217 gradually start to supply an electric current, and the reference current 63 surpasses the electric current of the regenerating electric signal 65 at some moment. Then, the count allowable signal 210 changes from high to low, and the increment operation of the counter 206 is prohibited. Because the object signal is set to "1", the reference current 63 is set to the high-reference current at this time. The value of the reference current 63 can be shown as following equation.

$$IrefH=Iref1+Iref2 \qquad (4)$$

Next, the switch 220 is set to off. Then, the second reference current source 217 is cut off from the current comparator 140, and the reference current 63 can thus be shown in following equation.

$$Iref=Iref1 \qquad (5)$$

Because it was assumed that Iref2=k Iref1, by comparing the equations (4) and (5), following equation can be obtained.

$$Iref=IrefH/(1+k) \qquad (6)$$

Here, if assuming k=1, the reference current 63 becomes half of the high-reference current. Considering the low-reference current is not "0", there is a method to set the value of k so that Iref=0.6. IrefH in equation (6). According to the post-processing circuit 200 of the present embodiment, the effect, which is close to the effect of the post-processing circuit 200 shown in FIG. 7, can be obtained.

Figure 10:
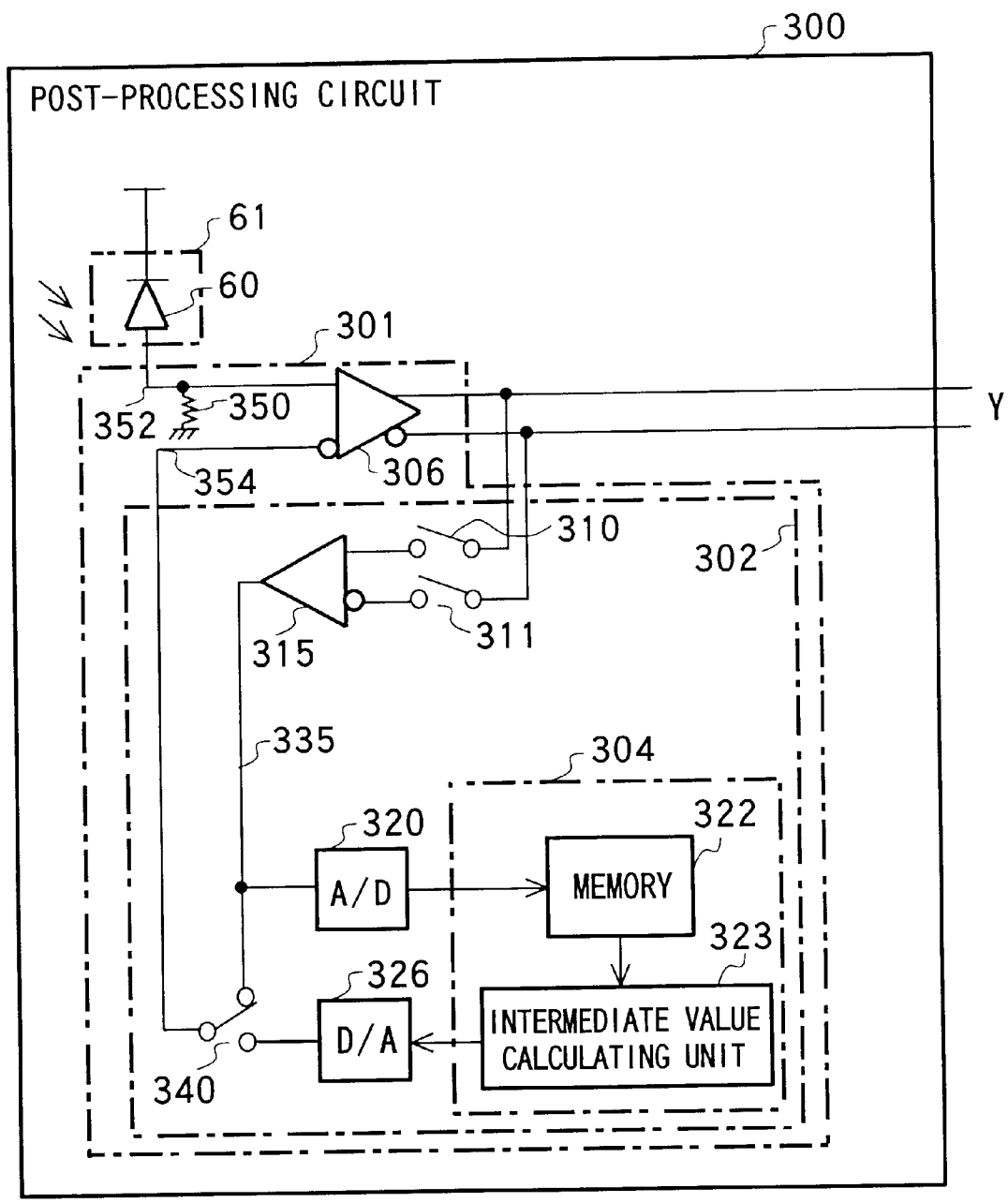
FIG. 10 shows a configuration of the further another embodiment of the post-processing circuit 300.

FIG. 10 shows a configuration of further another embodiment of the post-processing circuit 300. The post-processing circuit 300 shown in FIG. 10 has a photoelectric converting circuit 61 and a current controlling circuit 301. The current controlling circuit 301 includes a comparator 306 and a measuring circuit 302. The comparator 306 compares a voltage 352 that arises at the resistor 350 that is provided with an electric current of the regenerating electric signal 352, which is called a regenerating electric signal 352 in following, and a reference current 354. The measuring circuit 302 measures an electric current of the regenerating electric signal 352 output from the comparator 306.

The measuring circuit 302 has a differential amplifier 315. The differential amplifier 315 inputs each of the positive and negative outputs of the comparator 306 into each of the positive and negative input so the differential amplifier 315, respectively. A first switch 310 is provided to the route that connects between the positive output of the comparator 306 and the positive input of the differential amplifier 315. A second switch 311 is provided to the route that connects between the negative output of the comparator 306 and the negative input of the differential amplifier 315.

The measuring circuit 302 further has a A/D convertor 320, a memory 322, a intermediate value calculating unit 323, and a D/A convertor 326. The A/D convertor 320 converts an output 335 of the differential amplifier 315 to a digital value. The memory 322 holds the output data of the A/D convertor 320. The intermediate value calculating unit 323 calculates the intermediate value between the low-reference current and the high-reference current based on the data held in the memory 322. The D/A convertor 326 converts the intermediate value output from the intermediate value calculating unit 323 to an analog value. The memory 322 and the intermediate value calculating unit 323 form the reference value generating circuit 304. The third switch 340 connects one of the outputs of the D/A convertor 326 and the output 335 of the differential amplifier 315 to the negative input of the comparator 306.

The correcting operation of the above configuration will be explained. First, to set an initial condition for the correcting operation, the first switch 310 and the second switch 311 are on, and the third switch 340 is switched to the A/D convertor 320 side. At this time, a feed back loop is formed that starts from the comparator 306 and feeds back to the comparator 306 again through the differential amplifier 315. Thereby because of the imaginary short of the positive input and the negative input of the comparator 306, the output 335 of the differential amplifier 315 becomes the same electric potential as the electric potential of the positive input of the comparator 306. This electric potential is converted to the digital value by the A/D convertor 320 and is output to the memory 322.

At this condition, first, the object signal is set to "0". The electric current of the regenerating electric signal 352 and the reference voltage 354 matches, and the value of the reference voltage 354 becomes a low-reference voltage value. The low-reference voltage value, more correctly, the voltage of the output 335 of the differential amplifier 315 that corresponds to the low-reference voltage value is stored in the memory 322 through the A/D convertor 320. Next, the object signal is set to "1". As a result, a high-reference voltage value, more correctly, the voltage of the output 335 of the differential amplifier 315 that corresponds to the high-reference voltage value is stored in the memory 322 through the A/D convertor 320. The necessary information for the correcting operation can be obtained by the above operation.

Next, the intermediate value calculating unit 323 calculates the intermediate value, such as a median for example, between the low-reference voltage and the high-reference voltage held in the memory 322. The calculated intermediate value is converted to an analog value by the D/A convertor 326. The correcting operation is completed when the D/A convertor 326 outputs the analog value of the intermediate value.

Then, both the first switch 310 and the second switch 311 is switched off, and the third switch 340 is set to the D/A convertor 326 side, thereby the intermediate value is input to the negative input of the comparator 306 as a reference voltage 354. Therefore, the same effect shown above can be also obtained by the embodiment shown in FIG. 10.

The other embodiments will be explained below. First, in the pre-processing circuit 2 shown in FIG. 3, the first counter 20 and the second counter 22 perform the increment operation, however, the first counter 20 and the second counter 22 may perform a decrement operation. In this case, because the electric current of the regenerating electric signal 65 becomes a maximum value just after the start of the correcting operation, the logic of the count allowable signal 35 reverses compared to when performing the increment operation. Therefore, a positive logic output of the buffer amplifier 68 may be used for the count allowable signal 35 instead of using the negative logic output of the buffer amplifier 68.

Similar changes can be made for the third counter 120 and the fourth counter 122 of the post-processing circuit 102 shown in FIG. 7. In this case also, because the logic of the count allowable signal 162 reverses, a negative logic output terminal may be provided to the buffer amplifier 114, and the output of the negative logic output of the buffer amplifier 114 may be used for the count allowable signal 162.

In the pre-processing circuit 2 shown in FIG. 3, the clock signal 32 is masked in order to prohibit the count operation of the first counter 20 and the second counter 22. As in other embodiments, for example, the count allowable signal 35 may be used as a count enable signal of the first counter 20 and the second counter 22. In this case, the clock signal 32 does not have to be stopped even when the correcting operation is not performed. Similar changes can be made for the third counter 120 and the fourth counter 122 of the post-processing circuit 102 shown in FIG. 7.

According to the present invention, it is possible to make a desired correction on a signal to be transmitted by an optical signal transmission system. Particularly, it is easy to reduce the skew of the plurality of signals to be transmitted by the optical signal transmission system and maintain the duty ratio of the signal. These characteristics contribute to increasing the speed of transmission performed by the optical signal transmission system.

Although the present invention has been described by way of exemplary embodiments, it should be understood that many changes and substitutions may be made by those skilled in the art without departing from the spirit and the scope of the present invention which is defined only by the appended claims.

What is claimed is:

1. A correcting method of an optical signal transmission system that applies an optical signal generated by light-emitting action to an input end of an optical fiber and converts an optical signal arising at an output end of said optical fiber to an electrical signal by photo-electric conversion including:

transmitting said optical signal by inputting said optical signal to said optical fiber and generating said electrical signal;

adjusting at least one of an electric current related to said light-emitting action and an electric current related to said photo-electric conversion according to an electric current of said electric signal;

measuring a magnitude of electric current of the electric signal; and determining a lower reference level of the electric signal generated upon the photo-electric conversion based on said measured magnitude of said electric current of the electrical signal.

2. A correcting method as claimed in claim 1, wherein said adjusting of an electric current includes: adjusting a magnitude of an electric current, which generates said light-emitting action, so that a magnitude of an electric current of said electric signal and a magnitude of a predetermined reference current match.

3. A correcting method as claimed in claim 2, wherein said adjusting of an electric current includes:

adjusting each of two kinds of values of electric currents that generate said light emitting-action according to said two kinds of large and small values; and holding each of said adjusted two kinds of values of electric current individually.

4. A correcting method as claimed in claim 3, wherein small side of value among said two kinds of large and small values is determined by assuming a condition in which said optical signal has a faint intensity, which is not "0."

5. A correcting method as claimed in claim 2, further includes: judging whether a magnitude of an electric current, which generates said light-emitting action adjusted by said adjusting of an electric current, is within a predetermined permission level.

6. A correcting method as claimed in claim 1, wherein said adjusting of an electric current includes: adjusting said magnitude of a reference current, which is used for detecting a magnitude of an electric current of said electric signal, at a circuit related to said photo-electric conversion so that a magnitude of an electric current of said electric signal generated at said transmitting of said optical signal, and said magnitude of said reference current matches.

7. A correcting method as claimed in claim 6, wherein said adjusting of an electric current includes:

generating two values, which are to be shown by said optical signal sequentially;

adjusting each of two kinds of values of said reference current; and holding said each of adjusted two kinds of values individually.

8. A correcting method as claimed in claim 7, wherein said adjusting of an electric current includes:

generating an intermediate value between said adjusted two kinds of values; and judging which of said two kinds of values is shown by said optical signal based on a comparison between said intermediate value and said magnitude of an electric current of said electric signal.

9. A correcting method as claimed in claim 7, further comprising: judging whether said adjusted two kinds of values adjusted at said adjusting of an electric signal are within a predetermined permission level.

10. A correcting method as claimed in claim 6, wherein said adjusting of an electric current includes:

adjusting a value of said reference current by generating one of two values to be shown by said optical signal; and holding said adjusted value of said reference current.

11. A correcting method as claimed in claim 10, wherein said adjusting of an electric current includes:

setting a value of an electric current, which is to be compared to said magnitude of an electric current of said electric signal to judge which of said two values is shown by said optical signal, based on said adjusted value of said reference current.

12. A correcting method as claimed in claim 10, further comprising: judging whether said adjusted value of said reference current adjusted at said adjusting of an electric signal is within a predetermined permission level.

13. An optical signal transmission system having a pre-processing circuit that includes a light-emitting circuit and processes a signal to be input to an optical fiber, and a post-processing circuit that includes a photo-electric conversion circuit and converts a signal output from said optical fiber to an electric signal comprising:

a current controlling circuit which adjusts an electric current of said pre-processing circuit or said post-processing circuit according to an electric current of said electric signal such that the electric current of said electric signal is significantly equal to a determined lower reference level;

a measuring circuit which measures a magnitude of said electric current of said electric signal; and a reference value generating circuit that sets a reference current for determining said electric signal in two values bases on said measured magnitude of said electric current of said electric signal.

14. An optical signal transmission system as claimed in claim 13, wherein said current controlling circuit adjusts an electric current which generates a light-emitting action at said light-emitting circuit according to said electric current of said electric signal.

15. An optical signal transmission system as claimed in claim 14, wherein said current controlling circuit has a storing circuit which holds a magnitude of an electric current of said electric signal when said magnitude of an electric current of said electric signal matches a magnitude of a predetermined reference current.

16. An optical signal transmission system as claimed in claim 15, wherein said storing circuit includes a circuit that holds said magnitude of an electric current of two kinds of said electric signal, each corresponding to each of said magnitude of said reference current having two kinds of large and small values.

17. An optical transmission system as claimed in claim 14, wherein said post-processing circuit has a comparison circuit that compares a magnitude of said electric current of said electric signal and a magnitude of a predetermined reference current; and said current controlling circuit includes:

a circuit that changes a magnitude of an electric current, which generates said light-emitting action, monotonously; and a circuit that fixes a magnitude of an electric current which generates said light-emitting action when a relationship between said magnitude of an electric current of said electric signal and said magnitude of said reference current reverses.

18. An optical signal transmission system as claimed in claim 17, wherein said circuit that changes said magnitude of said electric current monotonously includes:

a counter circuit that performs increment operation or decrement operation; and said circuit that fixes a magnitude of said electric current includes a masking circuit that stops an increment operation or decrement operation of said counter circuit.

19. An optical signal transmission system as claimed in claim 14, further includes a circuit that judges whether a magnitude of said electric current which generates said light-emitting action adjusted by said current controlling circuit is within a predetermined permission level.

20. An optical signal transmission system as claimed in claim 13, further comprises an output circuit which determines said electric signal in two values based on said reference current.

21. An optical signal transmission system as claimed in claim 13, wherein said measuring circuit measures said magnitude of an electric current of said electric signal for each of two values, which is to be shown by said electric signal, individually; and said reference value generating circuit generates an electric current, a magnitude of which takes an intermediate value of said magnitude of an electric current of said electric signal measured individually, as said reference current.

22. An optical signal transmission system as claimed in claim 13, wherein said measuring circuit measures said magnitude of said electric current of said electric signal for one of two values, which is to be shown by said electric signal; and said reference value generating circuit sets a value of an electric current to be compared to said magnitude of said electric current of said electric signal for judging which of two values will be shown by said electric signal based on said measured magnitude of said electric current of said electric signal.

23. An optical signal transmission system as claimed in claim 13, further includes a circuit that judges whether said magnitude of said electric current of said electric signal measured by said measuring circuit is within a predetermined permission level.

* * * * *